United States Patent

[11] 3,560,669

[72] Inventors John D. Foulkes
Lexington;
Warren G. Bender, Wellesley, Mass.

[21] Appl. No. 802,067
[22] Filed Feb. 25, 1969
[45] Patented Feb. 2, 1971
[73] Assignee Wescom, Inc.
Downers Grove, Ill.
a corporation of Illinois, by mesne assignment

[54] ECHO SUPPRESSOR
23 Claims, 8 Drawing Figs.

[52] U.S. Cl. .......... 179/170.6, 179/170.2
[51] Int. Cl. .......... H04b 3/24
[50] Field of Search .......... 179/170.2, 170.6, 170.8

[56] References Cited

UNITED STATES PATENTS

| | | | |
|---|---|---|---|
| 3,275,759 | 9/1966 | Brady .......... | 179/170.6 |
| 3,305,646 | 2/1967 | Brady et al. .......... | 179/170.2 |
| 3,351,720 | 11/1967 | Brady .......... | 179/170.2 |

*Primary Examiner*—Kathleen H. Claffy
*Assistant Examiner*—William A. Helvestine
*Attorney*—Wolfe, Hubbard, Leydig, Voit & Osann

ABSTRACT: A voice controlled differential split echo suppressor employing linear logic circuitry for controlling the insertion and removal of loss in dependence upon the transmit and receive channel signal levels. The receive channel signal level exceeds a predetermined threshold level and the transmit channel signal level is below the receive channel average peak signal level, a relatively large suppression loss is immediately inserted into the transmit channel for operation of the echo suppressor in a suppression mode. Absent break-in by the near end subscriber, the echo suppressor remains in its suppression operating mode after the receive channel signal level falls below the threshold level until a predetermined suppression hangover time runs out at which time the suppression loss is removed and the echo suppressor is returned to operation in a quiescent mode. On the other hand, when the receive channel signal level is above the threshold level and the transmit channel signal level rises above the receive channel average peak signal level, the suppression loss is immediately removed from the transmit channel and a break-in loss, which increases with time from an initial negligible level to a final relatively low level, is inserted into the receive channel for operation of the echo suppressor in a break-in mode. The echo suppressor remains in its break-in operating mode after the transmit channel signal level drops below the receive channel average peak signal level until a predetermined break-in hangover time runs out, despite changes in the receive channel signal level. The suppression and break-in losses are provided by solid state devices which are switched from conductive to nonconductive states by still other solid state devices, so that the suppression and break-in operate times can be minimized without the production of significant switching transients.

INVENTORS.
JOHN D. FOULKES
WARREN G. BENDER
BY
Wolfe, Hubbard, Voit & Osann
ATTORNEYS.

INVENTORS.
JOHN D. FOULKES
WARREN G. BENDER
BY Wolfe, Hubbard, Voit & Osann
ATTORNEYS.

INVENTORS.
JOHN D. FOULKES
WARREN G. BENDER
BY
Wolfe, Hubbard, Voit & Osann
ATTORNEYS.

INVENTORS.
JOHN D. FOULKES
WARREN G. BENDER
BY
Wolfe, Hubbard, Voit & Osann
ATTORNEYS.

INVENTORS.
JOHN D. FOULKES
WARREN G. BENDER
BY
Wolfe, Hubbard, Voit & Osann
ATTORNEYS.

INVENTORS.
JOHN D. FOULKES
WARREN G. BENDER
BY
Wolfe, Hubbard, Voit & Osann
ATTORNEYS.

ECHO SUPPRESSOR

BACKGROUND OF THE INVENTION

The present invention relates to telephony, and more particularly to echo suppressors for long distance telephone communications.

As is well known, long distance telephone communications may involve a single link or multiple links interconnected end-to-end, with each link generally comprising a 4-wire system between different local exchange areas and a two-wire system within each of the exchange areas. The conversion from the long distance 4-wire system to the local two-wire system, and vice versa, is effected by a hybrid circuit, which is sometimes referred to as a "two wire-four wire terminating set." Ideally, the hybrid circuit is perfectly balanced against or matched to the local two wire system, so that signals transmitted toward one exchange area are not retransmitted and returned toward the other exchange area as reflected or "echo" signals. Unfortunately, due to impedance differences that exist between the two wire systems within any given exchange area and the impedance irregularities that occur at the hybrid junctions, it is virtually impossible with existing techniques to obtain the ideal perfect impedance match between the hybrid circuit and each of the two-wire systems which, at any given time, may be associated therewith. Accordingly, it has been assumed that echo signals are an inherent, though undesired, part of long distance telephony, and "echo suppressors" have been employed to reduce the echo signals to a tolerable level.

Generally stated, an echo suppressor is a device which is placed in the 4-wire portion of a long distance telephone circuit or link for inserting loss into the return or echo path to suppress or reduce echo signals. A device of this type is required, particularly for voice communications, since echo signals that encounter return delays of more than about 45 milliseconds have a disturbing effect upon and may be utterly confusing to the average speaker. Of course return delays, i.e., round trip transit times, in excess of 45 milliseconds are not at all unusual. Indeed, with the advent of communication satellites, modern long distance telephone facilities are being designed to handle return delays of 600 milliseconds and longer.

Two general types of echo suppressors are commonly recognized; (1) "full echo suppressors," which protect the speakers at both ends of the circuit against the return of echo signals, and (2) "half" or "split echo suppressors," which protect the speaker at one end of the circuit against return of echo signals from the other end. Generally, full echo suppressors are effective only where the maximum return delay is quite moderate. Accordingly, split echo suppressors are most commonly employed in modern long distance telephone systems. As will become apparent, the present invention relates primarily to split echo suppressors, although certain of its features may also be advantageously utilized in full echo suppressors.

Split echo suppressors are employed in pairs, one at each end of the 4-wire portion of each long distance telephone link of for suppressing the locally produced echo signals to protect the speaker at the other end. To be effective, the echo suppressors must be able to rapidly and readily distinguish between echo signals and speech signals, since either or both speakers may be talking at any given time. The problem of distinguishing between these two signal types is a complicated one, since neither the loss that a signal will undergo after being received at one end of the circuit and before being retransmitted toward the other end as an echo signal (i.e., the so-called "end loss") nor the delay that such signal will encounter before being retransmitted (i.e., the so-called "end delay") is predictable with any reasonable degree of certainty. Accordingly, echo suppressors must be designed to accommodate the worst cases of both, which at the present stage of development in the art are an end delay as long as about 25 milliseconds and an end loss as low as about 6 dB. Moreover, the problem is further complicated by the fact that the level of the speech signals may vary over a range of about 40 dB. in a totally unpredictable manner.

In an effort to provide effective echo suppression for telephone circuits that may involve long return delays despite the aforementioned problems, differential split echo suppressors featuring independent suppression and break-in operating modes have recently been developed. The operation of this type of echo suppressor depends upon logic circuitry which determines whether one or both of the speakers are talking at any given time. On the one hand, whenever it is determined that only the far end speaker is talking and for a predetermined time thereafter (called the "suppression hangover time"), barring break-in or interruption by the near end speaker, the logic circuitry is effective to insert a relatively large amount of loss, typically a loss of about 60 dB. and commonly referred to as the "suppression loss," into the transmit path for the near end speaker. To prevent the return of a burst of echo signals each time the far-end speaker talks, the time lapse between the presence of speech signals from the far-end speaker and the insertion of the large suppression loss into the transmit path (called the "suppression operate time") should be less than about 1 or 2 milliseconds to accommodate all situations, including those where there is only a very slight end delay. On the other hand, when the near end speaker breaks in upon or interrupts the far end speaker and for a predetermined time thereafter (called the "break-in hangover time"), the logic circuitry is effective to remove the large suppression loss from the transmit path for the near end speaker and to insert a relatively small amount of loss, typically a loss of about 6 dB. and commonly referred to as the "break-in loss," into the receive path for the near end speaker. It has been found that this relatively small break-in loss, when combined with the masking effect of the break-in speech, is sufficient to protect the far end speaker against the potentially disturbing effects of return echo. To prevent mutilation or clipping of the first syllables of the break-in speech, the time lapse between the onset of the break-in speech and the removal of the large suppression loss (called the "break-in operate time") should, again, be less than about 1 or 2 milliseconds.

The prior art differential split echo suppressors have not been altogether satisfactory in this regard, since the logic circuitry thereof has not been able to reliably distinguish between echo and speech signals and, at the same time, provide the desired short suppression and break-in operate times. For the most part, these disabilities can be traced to the relatively low sensitivity of the logic circuitry that has been used, together with the limited range of input signal amplitudes that existing components for logic-type circuitry can withstand. The combination of these two factors has led to the use of compressor-type amplifiers to feed signals from the transmit and receive channels to the logic circuitry which, in turn, has required that certain compromises be made. For example, if the compressor amplifiers are provided with fast response times, an impulse-type signal in the send channel may very easily cause false break-in operation, since the gain of the usual compressor amplifier to such a signal is high. However, if the compressor amplifiers are designed to have slower response times so that impulse-type signals are averaged and the problems associated therewith are eliminated, the suppression and break-in operate times become undesirably long.

Furthermore, the prior art differential split echo suppressors have had the additional drawbacks of (1) rapidly inserting the small break-in loss upon break-in by the near end speaker and (2) employing electromechanical switches, such as relays, for inserting and removing the suppression and break-in loss. As will be appreciated, neither of the two last mentioned disadvantages are fatal to proper operation of the echo suppressor, but they both do have a degrading and potentially disturbing effect upon its performance. That is, the rapid insertion of the break-in loss may give the near end speaker the impression that the circuit has been broken. Likewise, the use of electromechanical switches creates transients which often result in the transmission of signals that produce audible clicking sounds.

SUMMARY OF THE INVENTION

A general object of the present invention is to provide a new and improved echo suppressor which is suitable for use in long distance telephone circuits that involve return delays at least as long as any presently encountered in long distance telephony, including the return delays associated with the use of communications satellites. A more specific object is to provide a differential split echo suppressor which has distinctive suppression and break-in operating modes and which is capable of reliably detecting and distinguishing between the conditions calling for operation in either of these two modes while, at the same time, maintaining short suppression and break-in operate times. A detailed related object of the present invention is to provide linear logic circuitry for an echo suppressor of the foregoing type, so that the proper operating mode for the echo suppressor is determined in dependence upon the signal levels in the transmit and receive channels for the near end speaker without any compression of the normal range of such signal levels. An even more detailed object is to provide logic circuitry for an echo suppressor of the foregoing type which linearly compares the signal level in the receive channel with a predetermined threshold level to provide operation of the echo suppressor in its suppression mode when the receive channel signal level exceeds the threshold level and which linearly compares the signal level in the transmit channel with the level of a floating reference signal derived from the peak level of the receive channel signal to provide operation of the echo suppressor in its break-in mode when the transmit channel signal level exceeds the average peak level of the receive channel signal.

Another general object of the present invention is to provide an echo suppressor in which the transition from one operating mode to another is not noticeable to either of the speakers. A related object is to provide an echo suppressor in which loss is inserted and removed from the transmit and receive channels without the production of significant switching transients. A more specific object is to provide an echo suppressor which employs electronic switching devices for inserting and removing the loss into and out of the transmit and receive channels. Still another related object is to provide a differential split echo suppressor in which the break-in loss is gradually inserted when the echo suppressor is switched to its break-in operating mode.

Finally, it is an object of the present invention to provide a new and improved differential split echo suppressor which fully satisfies all existing and proposed national and international specifications for such echo suppressors and which is fully compatible with a wide variety of other type of new and existing differential split echo suppressors.

BRIEF DESCRIPTION OF THE DRAWINGS

Other objects and advantages of the present invention will become apparent upon reading the following detailed description in conjunction with the accompanying drawings, in which.

DETAILED DESCRIPTION OF THE ILLUSTRATED EMBODIMENT

While the invention will be described hereinafter in detail with reference to an illustrated embodiment, it is to be understood that the intent is not to limit it to that embodiment. On the contrary, the intent is to cover all alternatives, modifications and equivalents as may be within the spirit and scope of the invention as defined by the appended claims.

A. Environment

Figure 1:
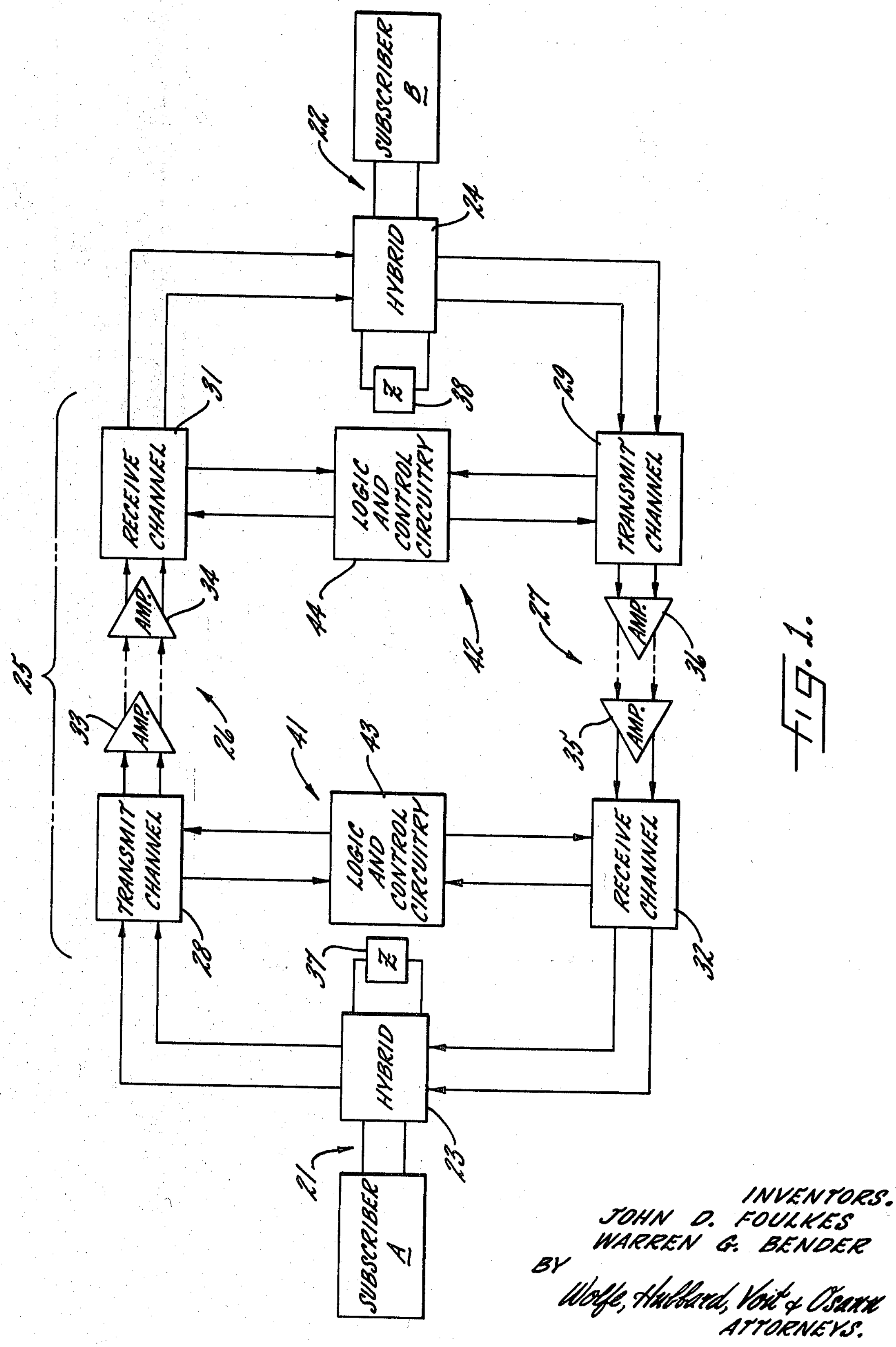
FIG. 1 is a simplified block diagram of a single link long distance telephone circuit incorporating a pair of differential split echo suppressors.

Turning now to the drawings, and particularly to FIG. 1, there is shown a typical long distance telephone circuit for communication between two subscribers A and B. The terminals, or more precisely for the case of voice communications, the hand sets (not shown) for the subscribers A and B, are connected via respective local two-wire systems 21 and 22 and hybrid circuits 23 and 24 to the opposite ends of a long distance 4-wire system 25, which includes separate paths 26 and 27 for transmission from each subscriber to the other. As shown, the paths 26 and 27 include transmit and receive channels 28, 29 and 31, 32, respectively, for each of the subscribers. The transmit channel for each subscriber is connected to the receive channel for the other subscriber through a number of repeater amplifiers 33, 34 and 35, 36, which are provided to supply the amplification required to compensate for whatever transmission loss there may be. The long distance circuit shown will be recognized as being a basic single link system. However, it will be appreciated that the present invention may equally as well be employed in much more sophisticated systems, such as those including multiple links and communications satellites (not shown).

The hybrid circuits 23 and 24, which are typically hybrid transformers, are provided to couple signals from the 4-wire system 25 to the two-wire system 21 and 22, respectively, and vice versa. Ideally, they are perfectly balanced by terminating impedances 37 and 38, respectively, so that the two paths 26 and 27 of the 4-wire system form conjugate arms, with the result that signals in one path have no effect upon and are not seen by the other path. However, as previously mentioned, due to the impedance differences that exist between the local two-wire systems that may at any given time be coupled to the hybrid circuits and the impedance irregularities that occur at the hybrid junctions, it is virtually impossible to select a terminating impedance to provide the required perfect impedance balance or match. Accordingly, the values of the terminating impedances 37 and 38 are selected to provide a compromise between the different impedance values required for perfect termination of the hybrid circuits 23 and 24, respectively, so that the portion of the signal transmitted from one end which is passed through the hybrid circuit at the other end for retransmission as an echo signal is minimized. Echo suppression is then employed to reduce the echo signal to a tolerable level.

B. Echo Suppressor

1. General

In the illustrated embodiment, the echo suppression is effected by a pair of differential split echo suppressors 41 and 42, each of which is located at a respective end of the 4-wire portion 25 of the circuit to prevent return of potentially disturbing echo signals toward the other or far end of the circuit. To accomplish this while at the same time permitting transmission by either of the subscribers in the presence or absence of transmission by the other subscriber, the echo suppressors 41 and 42 include respective logic and control circuits 43 and 44, each of which determines the signal conditions in the send and receive channels for the near end subscriber to controllably insert and remove attenuation or loss into and out of such channels in dependence upon the existing signal conditions.

As here shown, the echo suppressors 41 and 42 are substantially identical. Accordingly, only one of them will be described in detail, and it is to be understood that the description applies equally as well to the other. Moreover, it is to be understood that the split echo suppressor provided by the present invention is not dependent for its operation upon being paired with another split echo suppressor of same design. To the contrary, the echo suppressor of the present invention is fully compatible with a wide variety of new and existing split echo suppressor designs and, therefore, may be employed at one end of a long distance telephone link which has a split echo suppressor of an entirely different design at its other end.

Figure 2:
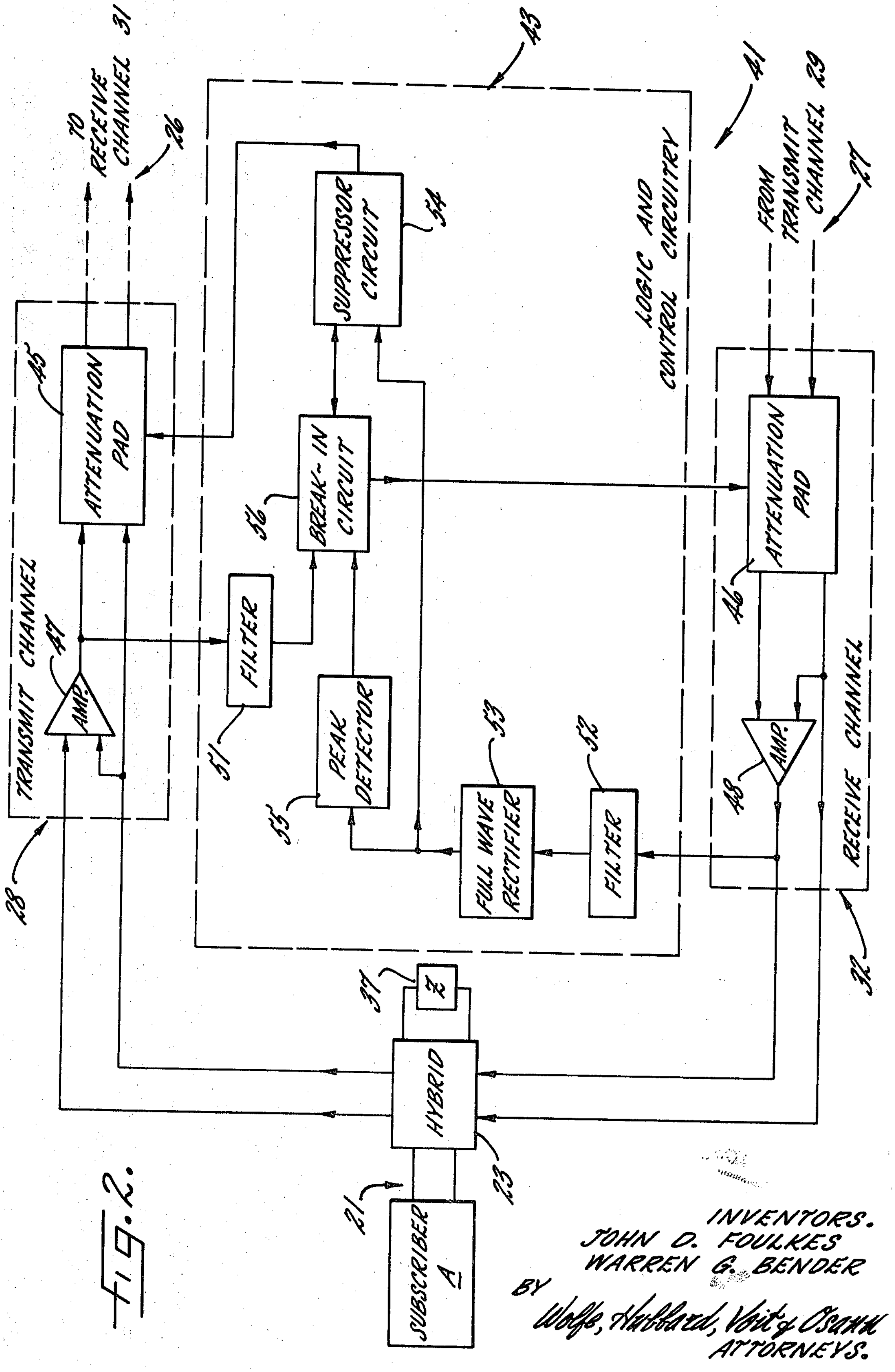
FIG. 2 is a more detailed block diagram illustrating the general features of an echo suppressor which is constructed in accordance with the present invention and which is suitable for use as one or both of the echo suppressors shown in FIG. 1.

Taking the echo suppressor 41 as the exemplary one, and referring to FIG. 2, it will be seen that it includes suppression and break-in attenuation pads or loss networks 45 and 46, respectively, which are switched into and out of the near end transmit and receive channels 28 and 32 by the logic and control circuitry 43 in dependence upon the signal conditions existing in these channels. More particularly, the logic and control circuitry 43 affords three distinctive operating modes for the echo suppressor 41 under different transmit and receive channel signal conditions: (1) when the receive channel signal level is below a predetermined threshold level, such as when the far end subscriber B is not transmitting, the echo suppressor is operated in a quiescent mode in which the attenuation pads 45 and 46 are both removed from the send and receive channels; (2) when the receive channel signal level is above the predetermined threshold level, such as when the far end subscriber B is transmitting, and for a predetermined suppression hangover time after the receive channel signal level again drops below the threshold level, the echo suppressor is operated in a suppression mode in which the suppression loss or attenuation pad 45 is inserted or switched into the transmit channel 28; and (3) when the receive channel signal level is above the threshold level and the transmit channel signal level is at least as high as the receive channel average peak signal level, such as when the near end subscriber A "breaks-in" by transmitting in the presence of a transmission from the far end subscriber B, and for a predetermined break-in handover time after the transmit channel signal level drops below the receive channel average peak signal level, the echo suppressor is operated in a break-in mode in which the attenuation pad 45 is switched out of or removed from the transmit channel 28 and the break-in loss or attenuation pad 46 is inserted or switched into the receive channel 32.

It should be noted that there is yet another operating mode for the echo suppressor 41; namely, a disabled mode in which the attenuation pads 45 and 46 are held out of the transmit and receive channels 28 and 32, respectively. This mode of operation occurs, regardless of the level of the signals in the transmit and receive channels, whenever the logic and control circuitry 43 is disabled. It is most commonly employed during use of the long distance telephone circuit as a data transmitting link between computers or the like. For a more detailed discussion of the operation of the echo suppressor in this mode, and for a full disclosure of a circuit for automatically disabling the logic and control circuit 43 during data transmission, reference is hereby made to our copending application Ser. No. 38,446 filed May 18, 1970, and entitled "-Tone Disabler."

In keeping with the general practice in the art, the attenuation pad 45 provides a relatively large amount of suppression loss, say 60 dB., so that when it is inserted into the transmit channel 28 for operation of the echo suppressor in its suppression mode, there is sufficient loss to reduce the echo signals retransmitted through this path to a tolerable, inaudible level. On the other hand, the attenuation pad 46 provides only a relatively small amount of break-in loss, say 6 dB., so that when it is inserted into the receive channel 32 for operation of the echo suppressor in its break-in mode, the simultaneous or "double talking" transmissions of the subscribers are both audible and intelligible, and the level of the echo signals is sufficiently reduced to enable the masking effect of the transmission from the near end subscriber A to eliminate the potentially disturbing effect of the echo signals returned to the far end subscriber B.

To enable the logic and control circuitry 43 to determine the proper operating mode for the echo suppressor 41, input signals therefor are derived from points in the near end send and receive channels 28 and 32 at which the signal levels bear a known ratio to one another when test signals of identical amplitude are applied to both channels without any echo suppressing loss being inserted therein. Generally, the transmit and receive channels of long distance telephone circuits include respective amplifiers 47 and 48, which are selected to restore the transmit and receive signals to a 0 dB. relative level. Accordingly, the signal levels at the outputs of the amplifiers 47 and 48 are substantially identical under the above stated test conditions and the input signals for the logic and control circuit 43 may, therefore, be conveniently derived therefrom, as shown. However, it is to be understood that this showing is strictly exemplary, and that there may be other points within the transmit and receive channels of any given long distance circuit at which the signals therein bear a known ration ratio to one another under the stated test conditions and from which the input signals for the logic and control circuitry can, therefore, be derived.

In keeping with an important feature of the present invention, and unlike prior art differential split echo suppressors, the logic and control circuitry 43 is sufficiently sensitive to linearly analyze the signals existing in the transmit and receive channels 28 and 32 to determine the proper operating mode for the echo suppressor, despite the extremely low level range of these signals, which is typically from about 20 millivolts to about 1.5 volts. Accordingly, compressor amplifiers need not be used and the aforementioned problems associated with their use are eliminated. As a result, the echo suppressor of the present invention is capable of reliably distinguishing between conditions calling for operation of it in each of its different operating modes and yet its suppression and break-in operate times are only about 1 millisecond.

More particularly, the input signals from the send and receive channels 28 and 32 are passed through band-pass filters 51 and 52, respectively, each of which has a pass band of about 300—3,000 cps., thereby attenuating the high and low frequency noise components generally found in long distance telephony while still providing a frequency range within which a substantial portion of the speech signals fall during normal telephone conversation. The filtered input signal from the receive channel 32 is then applied to a full wave rectifier 53 where it is converted to a DC signal that has a level which closely corresponds to and follows the signal level actually existing in the receive channel. This DC signal is, in turn, applied to a suppressor circuit 54 and a peak detector 55.

To afford operation of the echo suppressor in its quiescent and suppression modes, the suppressor circuit 54 determines whether the DC signal provided by the full wave rectifier 53 is above or below a predetermined threshold level. So long as the DC signal remains below the threshold level, the suppressor circuit 54 is disabled and the suppression loss 45 is removed from the transmit channel 28. However, within a very short time, (i.e., the suppression operate time,) after the DC signal rises above the threshold level, the suppressor circuit 54 is enabled to insert the suppression loss 45 into the transmit channel. The short suppression operate time, i.e., 1 millisecond or so, assures that the suppression loss is inserted into the transmit channel 28 before potentially disturbing echo signals have the opportunity to travel from the output of the receive channel 32, through the hybrid 23 and into the send channel 28, regardless of what end delay may be present.

Subsequently, when the level of the DC signal provided by the full wave rectifier 53 again falls below the threshold level, the suppressor circuit 54 pauses for a predetermined time, the suppression hangover time, before removing the suppression loss 45 from the transmit channel 28. Should the DC signal level rise above the threshold level during the suppression hangover time, the suppressor circuit 54 quickly recycles to prevent the removal of the suppression loss. To provide full protection for the far end subscriber, the suppression hangover time is selected to be a period in excess of the worst possible case of maximum end delay, which as before mentioned is about 25 milliseconds. Further, to prevent false operation of the echo suppressor, the threshold level for operation of the suppressor circuit 54 is selected to be a level somewhat higher than the level of maximum noise in the receive channel 32.

So long as the near end subscriber A is quiet, the echo suppressor 41 simply inserts and removes the suppression loss 45 into and out of the transmit channel 28 in dependence upon the receive channel signal level. However, the near end subscriber A can break in upon or interrupt a transmission from the far end subscriber B by simply speaking as loud as or louder than the subscriber B. To this end, the filtered input signal from the transmit channel 28 is applied to the break-in circuit 56 where it is linearly compared against a floating DC reference signal which is provided by the peak detector 55 and which represents the average peak signal level in the receive channel 32.

The break-in circuit 56 determines whether or not the near end subscriber A is attempting to break-in upon a transmission from the far end subscriber B. For this purpose, so long as the transmit channel signal level remains below the floating reference provided by the peak detector 55, the break-in circuit 56 assumes that the near end subscriber A is quiet and permits the suppression loss 45 to be inserted and removed from the transmit channel 28 by the suppressor circuit 54. However, whenever the level of filtered from the transmit channel 28 exceeds the floating reference, the break-in circuit 56 is then effective to disable the suppressor circuit 54 so that the suppression loss 45 is removed from the send channel 28 and to also insert the break-in loss 46 into the receive channel 32. As shown, in keeping with the general practice in the art, the break-in attenuation pad 46 precedes the pickoff point for the input signal to the logic and control circuitry 43 from the receive channel, with the result that advantage is taken of the well known hysteresis effect to aid the near end subscriber A in maintaining the echo suppressor in its break-in operating mode once break-in has been achieved.

Figure 3A:
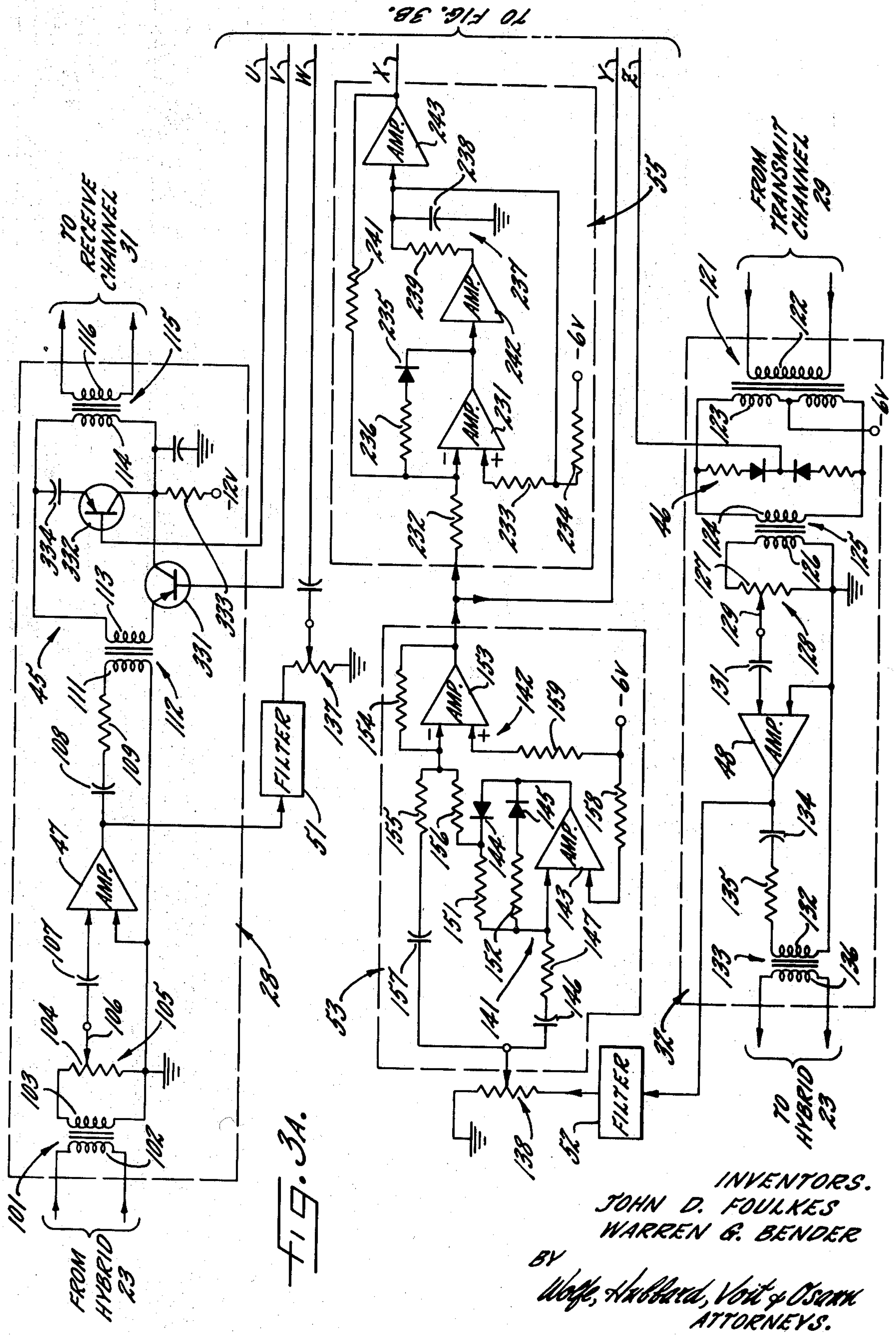
FIGS. 3A and 3B, when joined as indicated along the lines U—Z, form a simplified electrical schematic of the echo suppressor shown in FIG. 2.
Figure 3B:
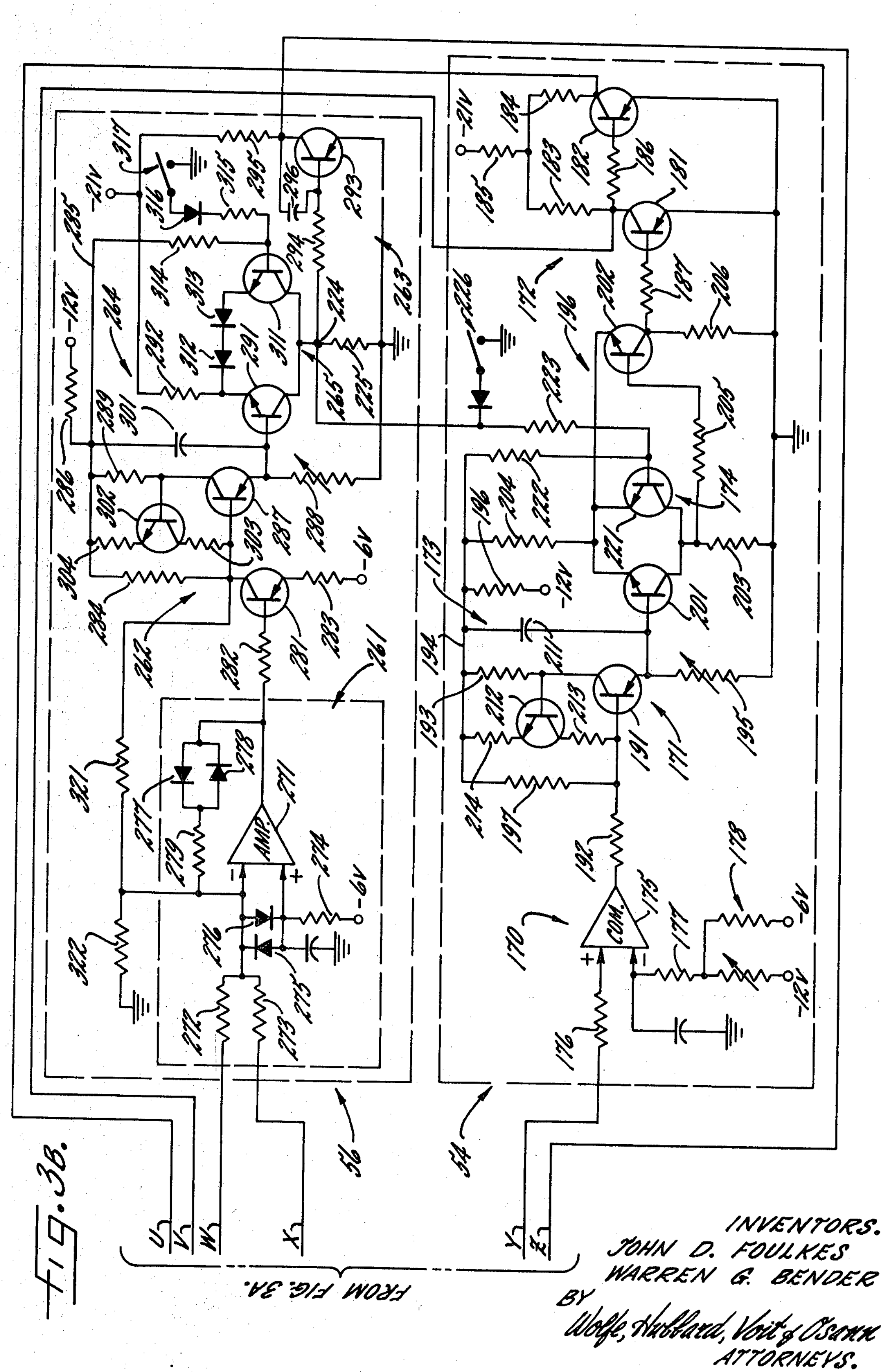

The foregoing will become clearer upon reference to FIGS. 3A and 3B, which provide a simplified schematic diagram of the echo suppressor 41 in combination with the send and receive channels 28 and 32, respectively, for the near end subscriber A when they are joined as indicated along the lines U through Z.

In the illustrated system, the transmit channel 28 comprises a balance-to-unbalance input transformer 101, which has its primary winding 102 coupled to the hybrid circuit 23 for the near end speaker A, typically through an impedance matching circuit (not shown), and a secondary winding 103 connected across the resistive element 104 of a potentiometer 105. The slider 106 of the potentiometer is positioned to pickoff a desired portion of the signal applied across the resistive element 104 and is connected to apply that portion of the signal through a coupling capacitor 107 to the input of the amplifier 47. The output of the amplifier 47 is, in turn, connected via another coupling capacitor 108 and a resistor 109 across the primary winding 111 of a DC isolating transformer 112. The secondary winding 113 of the transformer 112 is, in turn, connected through the suppression attenuation pad 45 to the primary winding 114 of an output unbalance-to-balance transformer 115, which has its secondary winding 116 coupled to the input of the receive channel 31 for the far end subscriber B, typically through further impedance matching circuits (not shown).

The receive channel 32 is generally similar in that it comprises a balance-to-unbalance input transformer 121, which has its primary winding 122 coupled to the output of the transmit channel 29 for the far end subscriber B, typically through impedance matching circuits (not shown), and its secondary winding 123 connected across the break-in attenuation pad 46. The break-in attenuation pad is, in turn, connected across the primary winding 124 of a DC isolating transformer 125, and the transformer 125 has its secondary winding 126 connected across the resistive element 127 of a potentiometer 128. The slider 129 of the potentiometer 128 is positioned to pickoff a desired portion of the signal applied across the resistive element 127, and is connected via a coupling capacitor 131 for applying this portion of the signal to the input of the amplifier 48. The output of the amplifier 48 is, in turn, connected through a coupling capacitor 134 and a resistor 135 across the primary winding 132 of an unbalance-to-balance output transformer 133. The secondary winding 136 of output transformer 133 is, in turn, coupled to the hybrid circuit 23, typically through yet another impedance matching circuit (not shown).

Of course, the transmit and receive 28 and 32 shown are merely simplified examples of these channels as they are frequently found in the 4-wire portion of presently existing long distance telephone circuits. It is, therefore, to be understood that the present invention does not depend upon there being transmit and receive channels precisely as shown.

2. Filters

Figure 4:
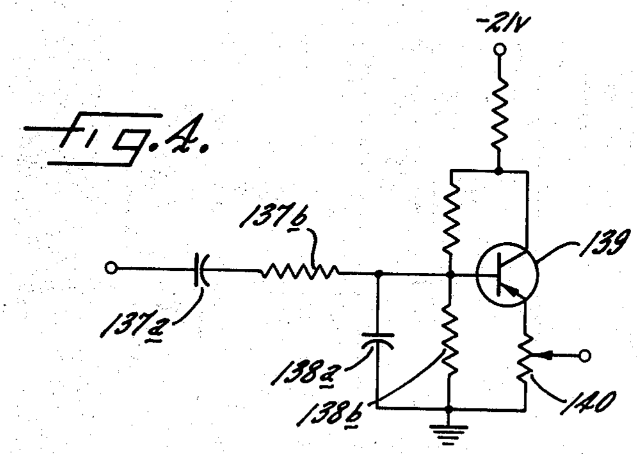
FIG. 4 is an electrical schematic of a filter which may be used in the echo suppressor shown in FIGS. 3A and 3B.

The loading effect of the logic and control circuitry 43 upon the transmit and receive channels 28 and 32 is preferably minimized, since the signals existing therein are at such very low impedance levels. In the illustrated embodiment this is accomplished by incorporating isolation into the band-pass filters 51 and 52. Referring for a moment to FIG. 4 where a circuit which is suitable for use as either one of the filters is shown, the low frequency filtering action is provided by a series RC circuit comprising a capacitor **137*a* and a resistor 137*b*, and the high frequency filtering action is provided by a shunt RC circuit comprising a capacitor 138*a* and a parallel resistor 138*b*. To provide the isolation required to minimize the loading effect of the logic and control circuitry 43 upon the transmit and receive channels, the series and shunt RC filter sections are, in turn, connected to the input of an emitter-follower transistor amplifier 139. Desirably, the output of the amplifier 139 includes a variable resistive element, such as a potentiometer 140, so that the input signal levels to the logic and control circuitry 43 can be adjusted to be identical to one another during setup of the echo suppressor and while identical test signals are applied to the transmit and receive channels, despite whatever small differences there may then be at the outputs of the amplifiers 47 and 48 or in the characteristics of the filters 51 and 52**.

3. Full Wave Rectifier

Returning to FIGS. 3A and 3B, one of the more critical elements of the echo suppressor 41 is the full wave rectifier 53. Effective operation of the echo suppressor depends upon the ability of this rectifier to convert the filtered signal derived from the receive channel 32 to a DC signal which closely corresponds in amplitude to the signal level actually existing in the receive channel, and this must be done despite the fact that the level of the signal in the receive channel varies in a very low level range from about 20 millivolts to about 1.5 volt. Conventional full wave rectifiers are not sufficiently sensitive to rectify such low level signals and this has been one of the principal reasons that compressor amplifiers have been required. For example, the forward voltage drops of the diodes used in conventional diode bridge-type rectifiers vary from about 0.2 volt to about 0.7 volt. Moreover, the forward voltage drops of the diodes are age, frequency and temperature dependent. However, there are full wave rectifiers that are available for rectifying such low level signals and which may, therefore, be employed.

For example, the illustrated full wave rectifier 53 performs the desired rectification in two steps: (1) the output signal from the band-pass filter 52 is passed through an operational amplifier-type half-wave rectifier and inverter 141 and (2) the output of the half-wave rectifier 141 is applied with the output of the filter 52 to a summing circuit 142 where the two are algebraically combined in such proportion that the resulting output from the summing circuit 142 is the desired full wave rectified version of the signal derived from the receive channel 32.

More particularly, as shown in FIG. 3A, the half-wave rectifier 141 includes an operational amplifier 143, which has its inverting input connected through a coupling capacitor 146 and an input resistor 147 to the output of the filter 52 and its noninverting input connected through a resistor 148 to a bias supply. A pair of oppositely poled diodes 144 and 145 are connected in parallel with one another between the output and inverting input of the amplifier 145, so that each of the diodes carries a respective half wave of the inverted signal appearing at the amplifier output terminal. Further, feedback resistors 151 and 152 are connected in series with the diodes 144 and 145, respectively, to cooperate with the input resistor 147 in establishing the closed loop gain for the amplifier 145.

As will be appreciated, with this arrangement, the effective voltage drops of the diodes 144 and 145 are simply their actual forward voltage drops divided by the open loop gain of the amplifier 143, which in the case of the typical operational amplifier is a factor on the order of 100,000. Thus, the effective forward voltage drops of the diodes are reduced from tenths of volts to negligible microvolt levels, at which they present no impediment to effective conversion of the signal existing in the receive channel to a corresponding DC signal.

The summing circuit 142 comprises an operational amplifier 153, with the usual feedback resistor 154 connected between its output and inverting input terminals, and a pair of input resistors 155 and 156. As shown, the input resistors 155 and 156 are connected at one end to the inverting input of the amplifier 153. The other end of the resistor 155 is connected via a coupling capacitor 157 to the output of the band-pass filter 52, while the other end of the resistor 156 is connected to the junction intermediate the diode 144 and the feedback resistor 151 of the half-wave rectifier 141. In this instance, the diode 144 carries the inverted negative going half cycle of the filtered signal provided by the band-pass filter 52. Accordingly, by proper proportioning so that the signal applied to the input resistor 156 has twice the effect of the signal applied to the input resistor 155, the output signal of the operational amplifier 154 is made to be a negative going, full wave rectified version of the signal supplied by the filter 52. The proper proportioning can, of course, be effected by selection of the closed loop gain of the operation amplifier 143, selection of the relative values of the input resistors 155 and 156, or both.

It is noteworthy that the non-inverting input terminals of the amplifiers 143 and 153 are shown as being connected to the same bias source through respective drift stabilizing resistors 158 and 159. In this way, the offset of the DC signal supplied by the rectifier 53 relative to the bias level is minimized. Indeed, the preferred situation is for the amplifier 143 to have a closed loop gain of two, so that the values of the input resistors 155 and 156 can be the same. In that event the offset of the DC signal relative to the bias level is simply the difference between the offsets of the outputs of the amplifiers 143 and 153 alone. Accordingly, with the preferred situation the offset of the DC signal supplied can practically be eliminated by employing identical amplifying sections as the amplifiers 143 and 153.

Figure 5:
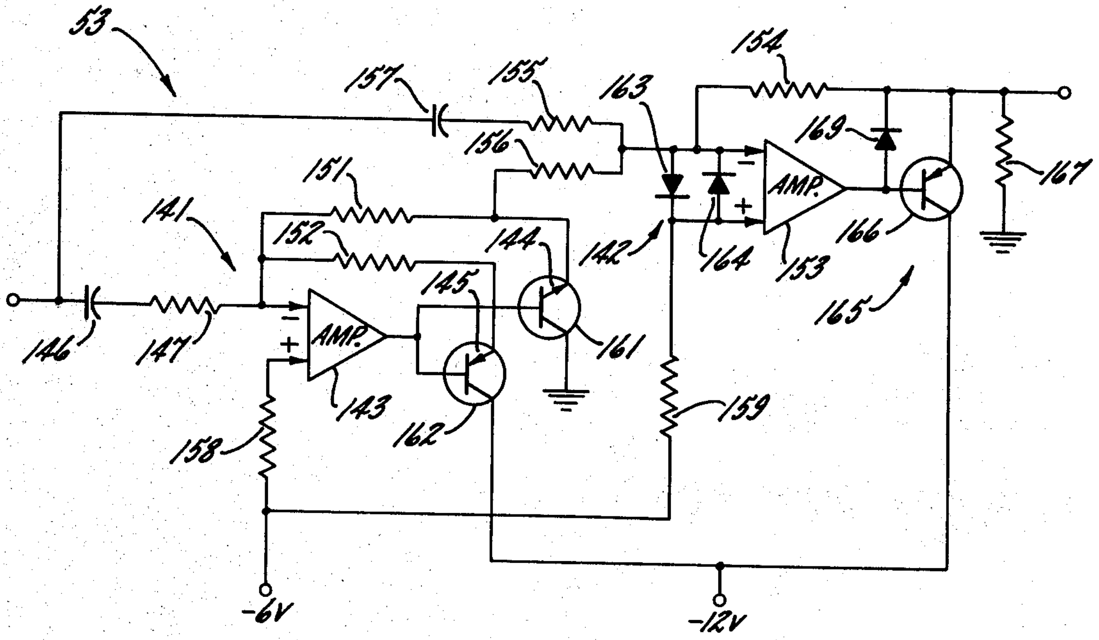
FIG. 5 is a more detailed electrical schematic of the full wave rectifier shown in FIG. 3A.

It should also be noted that in practice certain modifications may be advantageously introduced into the simplified full wave rectifier 53 shown in FIG. 3A. Referring for a moment to FIG. 5 for examples of some of the more important of these, the diode impedance levels may be minimized and their cutoff characteristics enhanced by employing the base-emitter junctions of complementary transistors 161 and 162 as the half-wave rectifying diodes 144 and 145, respectively. For this purpose, the transistors 161 and 162 are typically NPN and PNP-type transistors, respectively, and each has its base connected to the output terminal of the amplifier 145 and its emitter returned to the noninverting input of the amplifier through a respective one of the series feedback resistors 151 and 152. The collector of the NPN transistor 162 is connected to the negative terminal of an appropriate power supply (not shown), while the collector of the transistor 161 is returned to a point of reference potential, here indicated as being ground. Also, the operational amplifier 153 may be protected against excessive input voltages, such as transient spikes, by having a pair of oppositely poled diodes 163 and 164 connected in parallel across its input terminals. As will be appreciated, the diodes 163 and 164 form a limiting circuit which prevents the amplifier from being overdriven. However, the forward breakdown voltages of the diodes are sufficient to prevent them from exerting any limiting action upon any normal level speech signals from the receive channel 32. Accordingly, they in no way interfere with the operation of the suppressor circuit 54 or of the peak detector circuit 55, as hereinafter described. As a final example, the loading effect of the suppressor circuit 54 and the peak detector circuit 55 upon the full wave rectifier 53 is preferably minimized. For this reason, the suppressor and peak detector circuits are preferably driven through a buffer amplifier 165. Therefore, the output of the operational amplifier 153 is shown as being connected to the base of a transistor 166 which is connected in an emitter-follower configuration with an output or load resistor 167 connected between its emitter and a point of reference or ground potential.

From the foregoing, it will be appreciated that the full wave rectifier 53 closely tracks the receive channel signal level without any appreciable time lag. Moreover, since the level of the DC signal provided by the rectifier 53 linearly corresponds to the receive channel signal level, there is no danger of the DC signal level ever becoming disproportionately high relative to the receive channel signal level, despite the close tracking. Accordingly, the break-in and suppression operate times can be minimized, without risking improper operation of the echo suppressor.

4. Suppressor Circuit

To determine whether the echo suppressor is to be operated in its quiescent or suppression operating modes, the suppressor circuit 54 includes a threshold detecting means 170 which determines whether the level of the DC signal provided by the full wave rectifier 53 is above or below a predetermined suppression threshold level. When the level of the DC signal is above the threshold level, the threshold detecting means 170 triggers a driving circuit 171 which then, in turn, activates a switching means 172 to insert the suppression loss 45 into the transmit channel 28 for operation of the echo suppressor in its suppression mode. The driving circuit 171 includes a delay means 173 which is effective when the DC signal provided by the full wave rectifier 53 falls from a level above the suppression threshold level to a level below the threshold level to delay the deactivation of the switching means 172 so that the suppressor circuit 54 pauses for the desired suppression hangover time before removing the suppression loss 45 from the transmit channel 28 and returning the echo suppressor to operation in its quiescent mode. It also includes an inhibiting means 174 which is effective when the near end speaker A breaks-in upon or interrupts a transmission from the far end speaker B to immediately deactivate the switching means 172 and to maintain it deactivated until the break-in hangover time runs out, despite the normal suppression hangover time and whatever signal conditions may later exist in the receive channel 32. Thus, the inhibiting means 174 assures that the near end speaker can seize control of the echo suppressor anytime he wishes to break-in.

More specifically, in the illustrated embodiment, the threshold detecting means 170 comprises a comparator 175 which linearly compares the level of the DC signals provided by the full wave rectifier 53 with a fixed reference or suppression threshold voltage to provide an output signal which has a polarity that depends upon whether the DC signal level is above or below the threshold level. To that end, the comparator 175 has its non-inverting input coupled via a resistor 176 to the output of the full wave rectifier 53 and its inverting input coupled via a resistor 177 and a variable voltage divider 178 to a negative bias supply. The variable voltage divider permits the suppression threshold level to be preset at a point slightly, say, about 8 dB., above the maximum receive channel noise level.

In keeping with the objective of minimizing the suppression operate time, full advantage is taken of the rapid response time of the full wave rectifier 53 to changes in the receive channel signal level by transistorizing the driving circuit 171 and the switching means 172.

Turning first to the switching means 172, to accommodate the novel suppression loss attenuation pad 45, which is described in detail hereinafter, the attenuation pad 45 is inserted and removed from the transmit channel 28 through the operation of a pair of transistors 181 and 182, each of which is switched from one state of conduction to the other in response to changes in the polarity of the output signal from the comparator 175. As shown, the transistors 181 and 182 have their collectors connected through respective load resistors 183 and 184 and a common dropping resistor 185 to a suitable bias supply, and their emitters returned to a point of reference or ground potential. In this particular configuration, the transistors 181 and 182 are normally nonconductive and normally conductive, respectively, and are connected in cascade by a current limiting resistor 186 which extends between the collector of the first transistor 181 and the base of the second transistor 182. The transistors 181 and 182 are switched to their conductive and nonconductive states, respectively, by a driving pulse applied to the base of the first transistor 181 through a current limiting resistor 187, and remain in those states so long as the driving pulse re maintains the base-emitter junction of the transistor 181 forwardly biased. As will be explained in more detail hereinafter, the attenuation pad 45 is inserted and removed from the transmit channel 28 when the transistors 181 and 182 are in their conductive and nonconductive states, respectively.

The driving circuit 171 for the transistors 181 and 182 provides a driving pulse with a very fast rise time whenever the output from the comparator 175 becomes negative. To that end, in the illustrated embodiment, there is a normally nonconductive keying transistor 191 which has its base connected through a current limiting resistor 192 to the output of the comparator 175, its collector connected through a load resistor 193 to a bias line 194, and its emitter returned through a load resistor 195 to a point of reference or ground potential. The bias line 194 is connected through a dropping resistor 196 to an appropriate bias supply.

The keying transistor 191 is biased by the voltage applied to the base thereof through a bias resistor 197 to become conductive just as soon as the output from the comparator 175 becomes negative. A pulse is, therefore, produced across the emitter load resistor 195 almost immediately after the receive channel signal level exceeds the predetermined suppression threshold level. Generally, of course, the pulse has a relatively slow rise time and is, therefore, not suitable for use as the driving pulse for the transistors 181 and 182, since a short suppression operate time is desired. However, this problem is readily solved by using the pulse produced across the emitter resistor 195 to trigger a fast acting pulse generator, such as a Schmitt trigger 196.

The Schmitt trigger 196 shown here is a common configuration in which a normally conductive transistor 201 is switched to its nonconductive state by the triggering pulse, thereby switching a normally nonconductive transistor 202 to its conductive state. To that end, on the one hand, the transistor 201 has its base connected to the emitter of the transistor 191, its collector returned through a load resistor 203 to the point of reference or ground potential, and its emitter connected through a resistor 204 to the bias line 194. On the other hand, the transistor 202 has its base connected through a current limiting resistor to the collector of the transistor 201, its collector returned through a load resistor 206 to the point of reference or ground potential, and its emitter connected through the resistor 204 to the bias line 194. Accordingly, a pulse with a very fast rise time is produced across the load resistor 206 whenever the Schmitt trigger 196 is triggered. It is this pulse which is applied through the current limiting resistor 187 to drive or switch the transistors 181 and 182. It will, therefore, be seen that a suppression operate time of about 1 millisecond is assured.

To provide the desired suppression hangover time, the delay means 173 maintains or extends the triggering pulse for the Schmitt trigger 196 after the receive channel signal level drops below the suppression threshold level and the output signal from the comparator 175 becomes positive, and this is done without materially affecting the suppression operate time. Suitably, the delay means 173 comprises a capacitor 211 which is connected across the input of the Schmitt trigger 196 between the bias supply 194 and the base of the transistor 201 to charge through the resistors 195 and 196 when the transistor 191 is in its nonconductive state and to discharge through the base-emitter junction of the transistor 191 when the transistor 191 is in its conductive state.

As will be appreciated, the suppression hangover time is determined by the charging time constant for the capacitor 211, while the suppression operate time depends upon the discharging time constant for the capacitor. Thus, the charging timing constant for the capacitor 211 may be relatively slow. Indeed, to permit some latitude in the selection of the suppression hangover time, the resistor 195 is preferably variable, so that the suppression hangover time can be adjusted over a range of from about 50 milliseconds to about 120 milliseconds. On the other hand, the discharging time constant for the capacitor 211 must be quite short, i.e., substantially negligible as compared with the desired suppression operate time, to assure that the capacitor 211 does not materially affect the suppression operate time. Accordingly, to provide the short discharging time constant for the capacitor 211 without creating problems in the biasing of the transistor 191, the delay means 173 further includes a transistor 212, which has its base connected to the collector of the keying transistor 191, its collector connected via a small dropping resistor 213 to the base of the keying transistor 191, and its emitter connected via a small biasing resistor 214 to the bias supply line 194. The state of conduction of the transistor 212 depends upon the state of conduction of the keying transistor 191. Thus, when the output signal from the comparator 175 is positive and the transistor 191 is in its nonconductive state, the transistor 212 is held in its nonconductive state and it, therefore, does not materially affect the bias applied to the keying transistor 191 through the bias resistor 197. On the other hand, when the output signal from the comparator becomes negative and the transistor 191 is switched to its conductive state, the transistor 212 is also switched to its conductive state. In this condition, the collector-emitter circuit of the transistor 212 provides a very low impedance path for the discharge current for the capacitor 211 and the discharge time constant for the capacitor therefore does not extend the suppression operate time beyond the 1 millisecond or so desired.

It should be noted that the short discharge time constant for the capacitor 211 also assures that the suppressor circuit 54 quickly recycles in the event that the receive channel signal level momentarily drops below the suppression threshold level, i.e., for any period shorter than the selected suppression hangover time, such as during a normal intersyllabic pause by the far end subscriber B. That is, assuming a brief pause to occur, the capacitor 211 begins to charge, but as soon as the receive channel signal level again exceeds the suppression threshold level, the capacitor 211 rapidly discharges through the base-emitter junction of the keying transistor 191 and the collector-emitter circuit of the transistor 212. As a result, the suppression loss 45 is not removed from the transmit channel 28 whenever the far end subscriber B pauses, but only when he pauses for a period in excess of the preselected suppression hangover time or when the near end subscriber A breaks-in.

To enable the near end subscriber A to break-in, the inhibiting means 174 includes a transistor 221 which has its collector-emitter circuit connected in parallel with the collector-emitter circuit of the input stage 201 of the Schmitt trigger 196. The base of the inhibiting transistor 221 is connected through a bias resistor 222 to the bias supply line 194 and through a current limiting resistor 223 to a point 224 in the break-in circuit 56 which, in turn, is returned to ground or reference potential through a resistor 225. As will become clearer from the following description of the break-in circuit 56, in the absence of a break-in transmission by the near end subscriber A, a relatively large negative drop is developed by current flow through the resistor 225 and the inhibiting transistor 221 is, therefore, held in a nonconductive state in which it does not affect the operation of the suppressor circuit 54. However, when the near end subscriber A breaks-in, the potential of the point 224 rises to substantially the ground or reference potential, with the result that the transistor 221 becomes conductive, thereby providing current flow through the resistor 203 to develop a potential thereacross which switches the output stage 202 of the Schmitt trigger 196 to its nonconductive state. The transistors 181 and 182 are then switched to their nonconductive and conductive states, respectively, and the suppression loss 45 is removed from the transmit channel 28.

As will be appreciated, there is no significant delay involved in the inhibiting action of the transistor 221. To the contrary, the suppression loss 45 is removed from the transmit channel 28 almost immediately after the transistor 221 is switched to its conductive state. Hence, there is no chopping or clipping of the first syllables of the break-in transmission, as has frequently been the case in prior art differential split echo suppressors. Moreover, once the inhibiting transistor 221 is switched to its conductive state, it remains in that state to inhibit the operation of the suppressor circuit 54 until the break-in hangover time runs out, regardless of whatever changed signal conditions may occur in the meantime in the receive channel 32. Thus, the inhibiting means 174 assures that the near end speaker can seize and maintain control of the echo suppressor at will.

Desirably, for use in adjusting the relative gains of the transmit and receive channels 28 and 32, the balance of the filters 51 and 52 the balance of the half wave rectifying and summing sections 141 and 142 of the full wave rectifier 53, and the threshold level for the comparator 175 of the suppressor circuit 56, provision is made for manually inhibiting the operation of the suppressor circuit independently of the operation of the break-in circuit 54. To that end, the base of the inhibiting transistor 221 is shown as being coupled through the current limiting resistor 223 to one side of a normally open switch 226. The other side of the switch 226 is connected to ground, so that when the switch is closed, the transistor 221 is switched to its conductive state to inhibit the operation of the suppressor circuit. As shown, to prevent the resistor 225 of the break-in circuit 56 from being bypassed when the suppressor circuit is manually inhibited, connected in series with the switch 226 there is ad a diode 227, which is poled to block current flowing in the direction of the normal current flow through the resistor 225.

5. Peak Detector

As previously mentioned the peak detector 55 provides a floating DC reference signal which represents the receive channel average peak signal level and which is employed in determining whether or not the near end subscriber A is attempting to break-in.

Referring first to the simplified showing in FIG. 3A, the peak detector 55 includes an operational amplifier 231, which has its inverting input coupled via an input resistor 232 to the output of the full wave rectifier 53 and its noninverting input coupled via a pair of resistors 233 and 234 to a negative bias supply. The bias supply for the operational amplifier 231 is ideally selected to be identical to the reference level for the negative going DC signal provided by the full wave rectifier 53. Accordingly, at least ideally, the output signal provided by the operational amplifier 231 is a positive going signal which is referenced to ground potential and which has an amplitude directly proportional to the level of the DC signal provided by the full wave rectifier 53. Of course, there may be some departure from the foregoing ideal conditions as a result of slight differences between the reference level for the DC signal provided by the full wave rectifier and the bias supply for the operational amplifier 231, or the like. Accordingly, to prevent such slight departures from significantly effecting the operation of the peak detector 55, the output of the operational amplifier 231 is clamped against significant negative going voltage swings by a diode 235 and a small resistor 236, which are connected in series in a negative feedback path between the output of the operational amplifier 231 and its inverting input.

To provide the desired floating reference signal the peak detector 55 further includes a RC integrating circuit 237. The time constants of the RC circuit 237 are selected so that the reference signal provided closely follows increasing receive channel peak signal levels, but appreciably lags behind decreasing receive channel peak signal levels. In this way, protection is afforded against fast break-in operation of the echo suppressor despite whatever end delay there may be, since the amplitude of the floating reference signal provided is always greater than that of any echo signal produced.

More specifically, as here illustrated, to accommodate the subsequently described comparison of the transmit channel signal level with the level of the floating reference signal provided by the peak detector 55, the floating reference signal is referenced to a preselected negative potential. That is, the RC integrator 237 includes a capacitor 238 which is coupled between the output of the operational amplifier 231 and ground through a resistor 239 and between ground and the negative bias supply for the operational amplifier 231 through the resistor 234. Accordingly, as the receive channel peak signal level increases, the capacitor 238 is charged toward ground potential by current flow through the resistor 239, which is selected to be relatively small to establish a relatively fast charging time constant for the capacitor 238, say, on the order of about 0.5 milliseconds, so that the floating reference signal provided closely follows increasing receive channel peak signal levels. On the other hand, as the receive channel peak signal level decreases, the capacitor 238 is discharged toward the potential of the negative bias supply by current flow through the resistor 234. The resistor 234 is, therefore, selected to establish a relatively slow discharge time constant for the capacitor 238, say, on the order of about 200 milliseconds, so that the level of the floating reference signal provided appreciably lags behind decreasing receive channel peak signal levels.

From the foregoing, it will, of course, be understood that the floating reference signal provided by the peak detector 55 has a negative polarity. However, it will also be understood that the floating reference signal is positive relative to the negative potential to which it is referenced. This is important to a full understanding of the subsequent description of the break-in circuit 56.

It is noteworthy that the closed loop gain provided by the peak detector 55 is preferably quite low, typically unity, and yet the full open loop gain of the operational amplifier 231 is available to substantially eliminate the effect of undesirable and unavoidable voltage drops on the level of the floating reference signal produced. To that end, the feedback resistor 241 which, with the input resistor 232, sets the closed loop gain of the operational amplifier 231, is connected between the output of the peak detector 55 and the inverting input of the operational amplifier 231.

It is also noteworthy that, in practice, to prevent the capacitor from overloading the output of the operational amplifier 231 or the input of the break-in circuit 56, it is generally desirable to isolate it. Thus, it is shown as being connected between buffer amplifiers 242 and 243.

Figure 6:
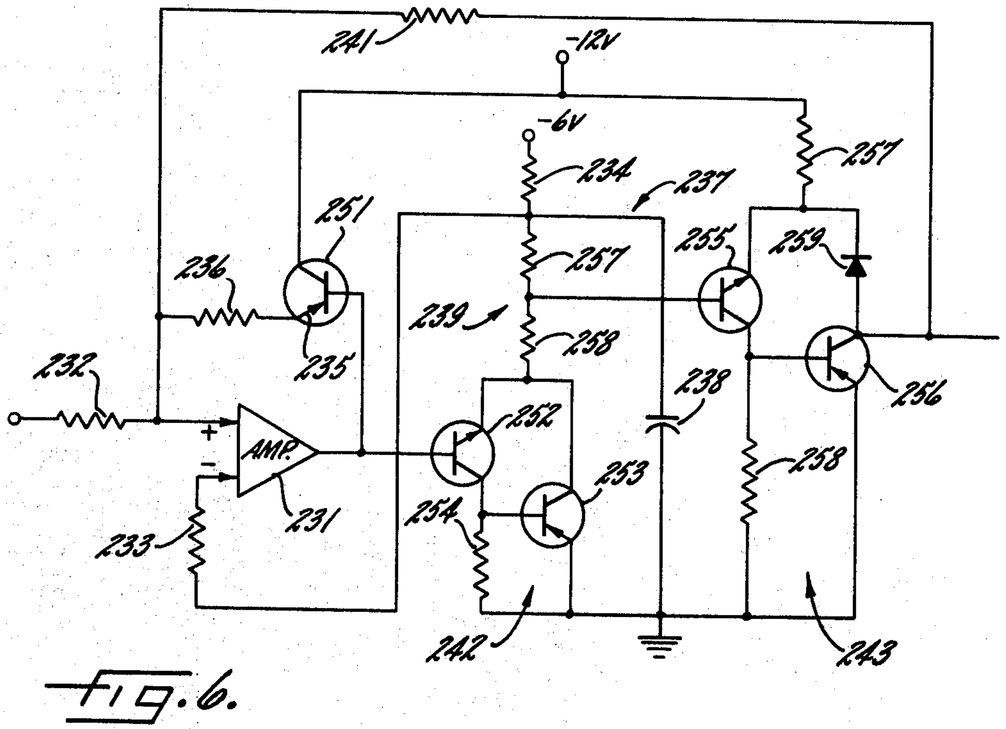
FIG. 6 is a more detailed electrical schematic of the peak detector shown in FIG. 3A.

Turning now to FIG. 6 and to the more detailed features of the peak detector 55, the clamping of the output of the operational amplifier 231 against negative voltage swings is improved by using the base-emitter junction of a transistor 251 as the diode 235, since the transistor provides a sharper cutoff characteristic and, therefore, permits the use of a smaller feedback resistor 236. Thus, the transistor 251 is shown as having its base connected to the output of the operational amplifier, its emitter connected via the resistor 236 to the inverting input of the amplifier, and its collector connected to a suitable source of bias potential.

Also, to achieve a significant current amplification while at the same time isolating the capacitor 238, the buffer amplifiers 242 and 243 are desirably compound transistor amplifiers. More particularly, as shown, the buffer amplifier 242 comprises a NPN-type transistor 252 and a PNP-type transistor 253, which have their collector-emitter circuits connected in parallel between the resistor 239 and the point of ground potential. The resistor 239 is, in turn, connected through the resistor 234 to the negative bias supply to which the floating reference signal developed across the capacitor 238 is referenced. The transistors 252 and 253 linearly amplify the positive going output signals supplied by the operational amplifier 231. To that end, the transistor 252 has its base connected to the output of the operational amplifier 231. The collector of the transistor 252 is connected to the base of the transistor 253 and via a load resistor 254 to the point of ground potential.

The buffer amplifier 243 is generally the same in that it comprises a NPN-type transistor 255 and a PNP-type transistor 256, which have their collector-emitter circuits connected in parallel between a bias resistor 257 and the point of ground potential. The bias resistor 257 is, in turn, connected to an appropriate source of negative bias potential. Moreover, the collector of the transistor 255 is connected to the base of the transistor 256 and via a load resistor 258 to ground.

However, unlike the output signal of the operational amplifier 231, the floating reference signal developed across the capacitor 238 is not referenced to ground. To the contrary, it is referenced to a negative potential. Thus, the transistors 255 and 256 are biased to linearly amplify the floating reference signal developed across the capacitor 238 while substantially maintaining the negative reference potential therefor. To that end, the resistor 239 is divided into two parts, a relatively low resistance section or resistor 257 and a relatively high resistance section or resistor 258, and the base of the transistor 255 is connected to the junction between the two sections. As a result, there is sufficient current limiting resistance between the base-emitter junction of the transistor 255 and the capacitor 238 to prevent the potential base-emitter voltage drop of the transistor 255 from significantly effecting the negative potential to which the voltage developed across the capacitor 238 is referenced. Also, the output of the peak detector is referenced upon a diode 259, which is connected between the collector of the transistor 256 and the bias resistor 257. The bias resistor 257 and diode 259 are selected so that the voltage drop across the transistor 256 when the capacitor 258 is fully discharged is approximately equal to the negative potential to which the floating reference signal is referenced. Of course, since the receive channel signal levels are so very low, i.e., from about 20 millivolts to about 1.5 volts, the forward voltage drop of the diode 259 is significant in comparison. Therefore, the negative reference voltage for the floating reference signal is maintained with a high degree of fidelity even as the floating reference signal varies.

6. Break-in Circuit

To determine whether or not the near end subscriber A is attempting to transmit, the break-in circuit 56 includes a comparator means 261 which compares the transmit channel peak signal level with the receive channel average peak signal level or, in other words, with the floating reference signal provided by the peak detector 55. When the transmit channel peak signal level exceeds the level of the floating reference signal, the comparator means 261 triggers a driving circuit 262 which then, in turn, activates a switching means 263. When activated, the switching means 263 disables or inhibits the suppressor circuit 54, to remove the suppression loss 45 from the transmit channel 28, and also inserts the break-in loss 46 into the receive channel 32 for operation of the echo suppressor in its break-in mode. On the other hand, except for the period of a break-in hangover time, whenever the transmit channel peak signal level is below the level of the floating reference signal, the break-in circuit 56 holds the break-in loss 46 out of the receive channel 32 and permits the suppression loss 45 to be inserted into and removed from the transmit channel 28 under the control of the suppressor circuit 54.

The driving circuit 262 includes a delay means 264, which is effective to cause the break-in circuit to pause after the transmit channel peak signal level drops from a level above that of the floating reference signal to a level therebelow for the desired break-in hangover time before removing the break-in loss 46 from the receive channel 32 and enabling the suppressor circuit 54. Should the transmit channel peak signal level again rise above the level of the floating reference signal before the break-in hangover time has run out, the driving circuit 262 quickly recycles and the echo suppressor, therefore, remains in its break-in operating mode. The driving circuit also includes an inhibiting means 265 which may be actuated to prevent operation of the echo suppressor in its break-in mode, regardless of the relative signal conditions in the transmit and receive channels.

More specifically, as shown, the comparator means 261 includes an operational amplifier 271 which has its inverting input connected to the junction of a pair of summing resistors 272 and 273 and its noninverting input coupled via a drift stabilizing resistor 274 to an appropriate source of negative reference potential, which is preferably a potential identical to that to which the floating reference signal is referenced. Desirably, to protect the break-in circuit from transient spikes and the like, a pair of oppositely poled diodes 275 and 276 are connected in parallel across the input terminals of the operational amplifier 271. Also, to prevent the driving circuit 262 from being overdriven, the output of the operational amplifier 271 is clamped against excessive voltage swings. To that end, connected between the output of the operational amplifier 271 and its inverting input, there are a pair of oppositely poled parallel diodes 277 and 278, which are connected in series with a small feedback resistor 279.

The resistors 272 and 273 are connected to receive the filtered transmit channel signal from the filter 51 and the floating reference signal from the peak detector 55, respectively. The operational amplifier 271, therefore, linearly compares these two signals and provides an output signal which has a polarity that depends upon whether the peak level of the signal supplied by the filter 51 is above or below the level of the floating reference signal. That is, in the illustrated case, the output signal supplied by the operational amplifier 271 is negative when the transmit channel peak signal level is below the level of the floating reference signal and positive when the transmit channel peak signal level is above the level of the floating reference signal. To assure that the polarity of the output signal provided by the operational amplifier 231 is a reliable indication of whether or not the near end subscriber A is attempting to break-in, the output potentiometer 137 of the filter 51 is adjusted with identical tests signals applied to the transmit and receive channels 28 and 32 to the point that the level of the filtered transmit channel signal then supplied just equals the level of the floating reference signal.

The driving circuit 262 activates the switching means 263 to inhibit the suppressor circuit 54 and to insert the break-in loss 46 into the receive channel 32 whenever the transmit channel peak signal level rises above the receive channel average peak signal level. To that end, the driving circuit 262 includes a transistor 281 which has its base connected via a current limiting resistor 282 to the output of the operational amplifier 271, its emitter connected via a biasing resistor 283 to a bias supply and its collector connected via a load resistor 284 to a power supply. The transistor 281 translates the small output signal swings provided by the operational amplifier 271 to larger swings, for example, swings of 6 volts or so, in order to assure proper operation of the balance of the driving circuit 262 and of the switching means 263. For that reason, it is biased to be switched from a state of saturated conduction to its nonconductive state when the output signal from the amplifier 271 becomes positive.

The driving circuit 262 responds to the polarity of the output signal from the operational amplifier 271 to provide a fast rise time driving pulse for the switching means 263 when the transmit channel peak signal level exceeds the receive channel average peak signal level. As previously mentioned, the output of the operational amplifier 271 is clamped to assure that the driving circuit 262 is not overdriven. Thus, to translate the relatively small swings of the output signal from the operational amplifier 271 to useful logic levels there is a transistor 281 which is switched from one state of conduction to the other by the changes in the operational amplifier output signal polarity. As here shown, the transistor 281 has its base connected through a current limiting resistor 282 to the output of the operational amplifier 271, its emitter connected via a biasing resistor 283 to a bias supply, and its collector connected through a load resistor 284 to a supply line 285. The supply line 285 is, in turn, connected via a dropping resistor 286 to a power supply. Hence, it will be seen that the transistor 281 is normally conductive. However, when the output signal from the operational amplifier 271 becomes positive going, the transistor 281 is rendered nonconductive. The power supply and bias supply are selected so that there is a pulse of significant amplitude, for example, 6 volts or so, produced across the resistor 284 as the transistor 281 is switched.

To provide the desired fast rise time driving pulse for the switching means 263, the driving circuit also includes a keying transistor 287 which is switched from a nonconductive state to a state of saturated conduction as the transistor 281 is switched to its nonconductive state. To that end, the keying transistor 287 has its base connected to the collector of the transistor 281, its emitter returned via a load resistor 288 to ground, and its collector tied through a resistor 289 to the supply line 285.

Desirably, to prevent even the first syllables of the break-in transmission from being clipped, the switching means 263 immediately responds to the driving pulse provided by the driving circuit 262 to activate the suppression circuit inhibiting means 174, so that the suppression loss 45 is quickly removed from the transmit channel 28. As previously mentioned, the suppressor circuit inhibiting means 174 is activated by causing the potential of the point 224 to approach ground potential. To that end, the switching means 263 includes a normally conductive transistor 291 which has its base connected to the emitter of the keying transistor 287, its emitter connected through a biasing resistor 292 to an appropriate negative power supply, and its collector connected through the resistor 225 to ground. Accordingly, absent transmission by the near end subscriber A, the current flow through the resistor 225 maintains the point 224 at a relatively large negative potential. However, when the near end subscriber transmits and the keying transistor 287 conducts, the driving pulse produced switches the transistor 291 to its nonconductive state. As a result, the potential at the point 224 approaches ground potential, thereby causing the suppressor circuit inhibiting transistor 221 to conduct which, in turn, causes the suppression loss 45 to be removed from the transmit channel 28. As can be seen, there is no appreciable lag in detecting a break-in transmission or in inhibiting the suppressor circuit 54. Therefore, a break-in operate time as low as about 1 millisecond is assured.

In keeping with one of the more detailed features of the present invention, the break-in loss 46 is gradually inserted and removed from the receive channel 32 as the echo suppressor is switched into and out of its break-in operating mode. For this purpose, the switching means 263 further includes a transistor 293 which is gradually switched from one stage of conduction to the other in response to the driving pulse provided by the driving circuit 263.

Suitably, the transistor 293 is a normally conductive transistor which is connected in cascade with the transistor 291. It is, therefore, shown as having its base connected through a current limiting resistor 294 to the collector of the transistor 291, its emitter returned to a point of ground or reference potential, and its collector connected through a load resistor 295 to an appropriate bias supply. Of course, as previously mentioned, the transistor 291 is rapidly switched from one stage of conduction to the other. Accordingly, to provide the desired gradual switching of the transistor 293, connected between its base and collector there is a capacitor 296.

Returning for a moment to the driving circuit 262, to provide the desired break-in hangover time, the delay means 264 extends the driving pulse for the transistors 291 and 293. To that end, the delay means 264 comprises a capacitor 301 which is connected between the supply line 285 and the emitter of the transistor 287 to charge through the resistors 286 and 288 when the keying transistor 287 is in its nonconductive state and to discharge through the base-emitter junction of the transistor 287 when the transistor is in its conductive state.

As will be seen, the break-in hangover time is determined by the charging time constant for the capacitor 301. Accordingly, the charging time constant may be relatively slow. Indeed, to permit the break-in hangover time to be selected as required for optimum performance, the charging time constant for the capacitor 301 is preferably variable, such as by changing the value of the resistor 288, so that the break-in hangover time can be adjusted over a range from about 150 to about 250 milliseconds.

On the other hand, to assure that the discharge time constant for the capacitor 301 does not extend the break-in operate time beyond the 1 millisecond period or so desired, provision is made to rapidly discharge it when the output of the operational amplifier 271 becomes positive and the keying transistor 287 is switched to its state of saturated conduction. To that end, the delay means 264 further includes a transistor 302 which has its base connected to the collector of the keying transistor 287, its collector connected through a small dropping resistor 303 to the base of the transistor 287, and its emitter connected through a small biasing resistor 304 to the supply line 285. Thus, the state of conduction of the transistor 302 depends upon the state of conduction of the keying transistor 287. That is, so long as the transistor 287 is held in its nonconductive state, the transistor 302 is also held in its nonconductive state. However, whenever the transistor 287 is switched to its state of saturated conduction, the transistor 302 is also switched to its state of saturated conduction, thereby providing a very low impedance path for the discharge current from the capacitor 301.

The short discharge time constant for the capacitor 301 assures that the break-in circuit 54 quickly recycles in the event that the transmit channel peak signal level drops below the level of the floating reference signal for a brief period less than the break-in hangover time. More particularly, as soon as the transmit channel peak signal level rises above the level of the floating reference signal, the capacitor 301 rapidly discharges through the base-emitter junction of the keying transistor 287 and the collector-emitter of the transistor 302. As a result, the echo suppressor is not switched from operation in its break-in mode whenever the transmit channel peak signal level falls below the receive channel average peak signal level, but only when the transmit channel peak signal level remains below the receive channel average peak signal level for a period in excess of the break-in hangover time.

Desirably, for use in adjusting the relative gains of the transmit and receive channels 28 and 32, and the balance of the filters 51 and 52, provision is made to manually inhibit the operation of the break-in circuit 54. To that end, the inhibiting means 265 includes a transistor 311 which has its collector connected to the resistor 225, its emitter connected via a pair of diodes 312 and 313 to the emitter of the transistor 291, and its base connected through a biasing resistor 314 to the supply line 285. The forward voltage drops of the diodes 312 and 313 are sufficient to assure that the transistor 311 is normally held in its nonconductive state in which it has no effect on the operation of the break-in circuit. However, connected to the base of the transistor 311 through a current limiting resistor 315 and a diode 316 there is a normally open switch 317 which is grounded. Thus, when the switch 317 is closed, the transistor 311 is switched to its conductive state to draw current through the resistor 225, thereby inhibiting operation of the break-in circuit 54, regardless of whatever signal conditions exist in the transmit and receive channels.

Figure 7:
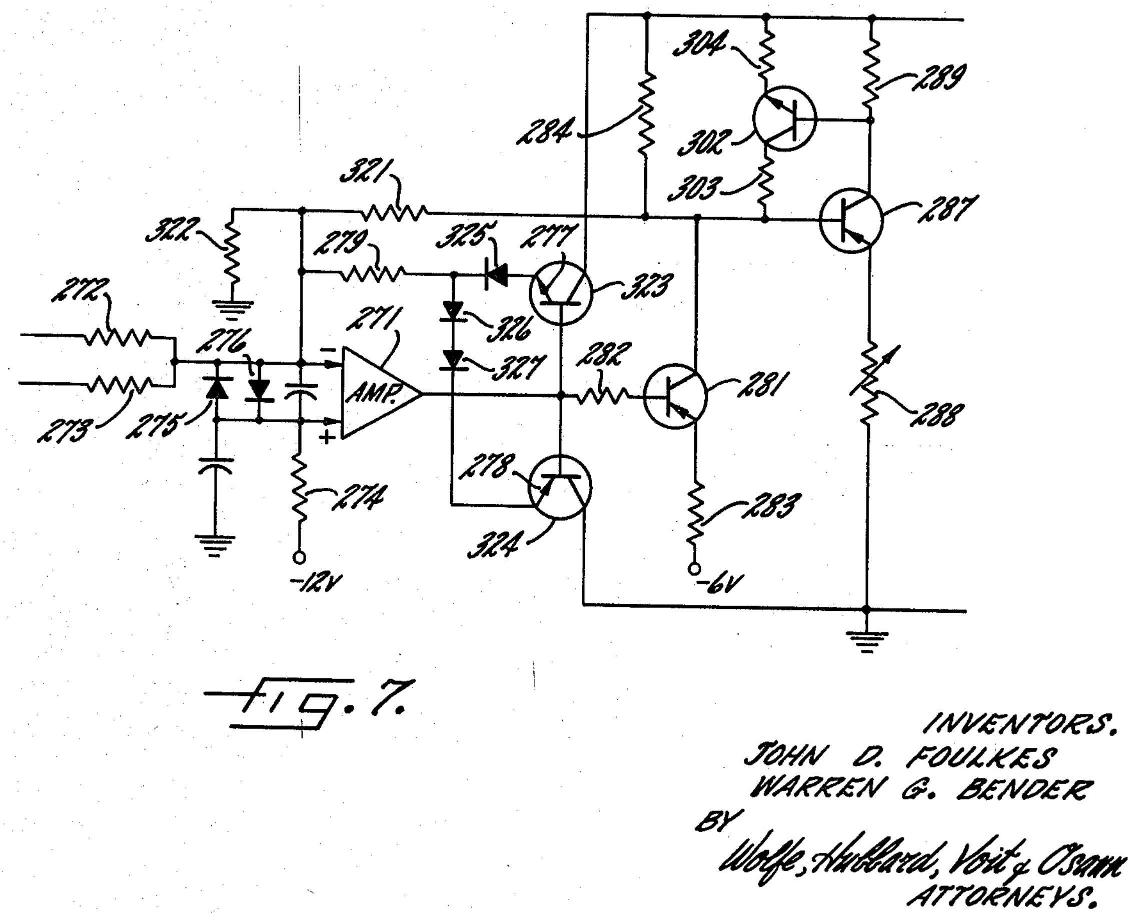
FIG. 7 is a more detailed electrical schematic of the comparator portion of the break-in circuit shown in FIG. 3B.

In practice certain refinements are preferably introduced into the comparator means 261. Referring to FIG. 7, the operational amplifier is preferably biased so that its output signal is negative under quiescent operating conditions. Furthermore, provision is desirably made to provide a small amount of hysterisis to aid in maintaining the echo suppressor in its break-in operating mode once it has been switched to that mode. For this reason, connected between the collector of the transistor 281 and the point of reference potential there are a pair of resistors 321 and 322. The resistors 321 and 322 have their common junction connected to the inverting input of the operational amplifier 271 and, therefore, form a voltage divider which applies a predetermined portion of the collector voltage of the transistor 281 as a bias voltage to the operational amplifier. Of course, under quiescent operating conditions, the transistor 281 is in its conductive state and its collector voltage is, therefore, relatively low, with the result that only a small bias voltage is then applied to the operational amplifier. On the other hand, when the echo suppressor is switched to operation in its break-in mode, the transistor 281 is switched to its nonconductive state and its collector voltage, therefore increases, or in the illustrated case, becomes increasingly negative. Thus, the voltage divider then applies a larger bias voltage to the operational amplifier 271 which aids the transmit channel signal level in maintaining a positive output signal from the operational amplifier 271 and, hence, aids in maintaining the echo suppressor in its break-in operating mode.

Also, to clamp the output of the operational amplifier 271, the base-emitter junctions of transistors 323 and 324 are used as the diodes 277 and 278, respectively. Again this is done to take advantage of the inherently sharper cutoff characteristics of the transistors to enhance the clamping action provided. Furthermore, to assure positive switching of the transistor 281 between its conductive and nonconductive states, the swing of the output signal provided by the operational amplifier 271 is increased slightly by connecting the diodes in series with the base-emitter junctions of the transistors 323 and 324. As shown, the transistor 323 has a single diode connected in series with its base-emitter junction. This assures that the positive going swings of the operational amplifier are sufficient to switch the transistor 281 to its nonconductive state, but not so large as to damage the base-emitter junction of the transistor. On the other hand, the transistor 324 has a pair of diodes 326 and 327 connected in series with its base-emitter junction. This provides the full open loop gain of the operational amplifier 271 to low level negative going signals and thereby assures that the transistor 281 switches to its conductive state in response thereto, despite the inherent forward voltage drop of its base-emitter junction.

7. Attenuation Pads

In keeping with another of the more detailed features of the present invention, the attenuation pads 45 and 46 are inserted and removed from the transmit and receive channels 28 and 32, respectively, without the use of mechanical switching devices or the like. As a result, no potentially disturbing switching transients are produced.

More particularly, returning to FIGS. 3A and 3B, the suppression loss pad 45 comprises a pair of transistors 331 and 332, which have their collector-emitter circuits connected in series and shunt, respectively, with the transmit channel 28. The transistors 331 and 332 have their collectors tied via a common dropping resistor 333 to an appropriate bias supply and their bases connected to the collectors of the transistors 181 and 182, respectively. Accordingly, it will be seen that during operation of the echo suppressor in other than its suppression mode, the series transistor 331 is held in a state of saturated conduction while the shunt transistor 332 is held in a nonconductive state, with the result that they then have little, if any, effect upon the transmit channel signal level. On the other hand, when the transistors 181 and 182 are switched for operation of the echo suppressor in its suppression mode, the series transistor 331 is switched to a nonconductive state and the shunt transistor is switched to a state of saturated conduction. The transistors 331 and 332 then present a substantial loss, for example, a 60 dB. loss, to the transmit channel signal. When the suppression loss is inserted into the transmit channel, the field of the transformer primary winding 114 collapses and, therefore, tends to produce an undesirable transient. For this reason, a capacitor 334 is connected in series with the collector-emitter circuit of the shunt transistor 332 to rapidly discharge the circuit stored by the primary winding 114 of the transformer 115.

The break-in loss 46 is preferably adapted to be gradually inserted and removed from the receive channel 32, so that its insertion and removal is not accompanied by sharp changes in the signal level received by the near end subscriber A. For that reason, the break-in attenuation pad 46 is shown as comprising two identically poled diodes 336 and 337, each of which has it anode connected via a respective resistor 338 and 339 to one side of the receive channel 32 and its cathode connected to the collector of the switching transistor 293. The diodes 336 and 337 are normally back biased by a bias applied, typically, to a midpoint of the transformer winding 123 and, therefore, have little, if any, effect on the receive channels signal level. However, as the transistor 293 is gradually switched from its conductive state to its nonconductive state for operation of the echo suppressor in its break-in mode, the diodes 336 and 337 are gradually forward biased. The forward bias applied across the diodes 336 and 337 increases with time from a low level at which the diodes are operating well down on the knee regions of their characteristic curves to a higher level at which the diodes are operated well above their knee regions. Thus, the impedance presented by the diodes gradually decreases from a high initial level to a low final level and, therefore, the shunt attenuating effect provided thereby gradually increases from a low level to a higher final level of, say, 6 dB. Of course, when the echo suppressor is switched out of operation in its break-in mode, the action of the diodes 336 and 337 is just the opposite and, hence, the shunt attenuating effect thereof is gradually reduced.

SUMMARY

It will now be understood that the echo suppressor of the present invention is capable of rapidly and reliably distinguishing between the transmit and receive channel signal conditions that call for operation of the echo suppressor in different ones of its operating modes, Moreover, it will be clear that the switching of the echo suppressor between different ones of its operating modes is accomplished without the production of switching transients or other potentially disturbing noise signals.

Finally, it will be seen that the changes in the signal level received by the near end subscriber resulting from switching of the echo suppressor into and out of its break-in operating mode are gradual and, therefore, not particularly noticeable.

We claim:

1. An echo suppressor for reducing echo signals in telephone systems of the type that include separate transmit and receive signal channels, said echo suppressor comprising the combination of a first relatively high loss attenuation pad for said transmit channel, a threshold detecting means coupled to said receive channel for linearly comparing the receive channel signal level with a predetermined threshold level, and a first switching means coupled between said threshold detecting means and said first attenuation pad for inserting and removing said first attenuation pad into and out of said transmit channel as said receive channel signal level rises above and drops below, respectively, said threshold level.

2. The echo suppressor of claim 1 further including a first delay means coupled between said threshold detecting means and said first switching means for delaying the removal of said first attenuation pad from said transmit channel for a predetermined period after said receive channel signal level drops below said threshold level.

3. The echo suppressor of claim 2 wherein said first attenuation pad comprises first and second electronic devices coupled in series and shunt, respectively, with said transmit channel, and said first switching means inserts said attenuation pad into said transmit channel by switching said first electronic device to a nonconductive state and said second electronic device to a conductive state and removes said first attenuation pad from said transmit channel by switching said first electronic device to a conductive state and said second electronic device to a nonconductive state, whereby said first attenuation pad is inserted and removed from said transmit channel without the production of switching transients.

4. The echo suppressor of claim 3 wherein said first electronic device is a first transistor having a collector-emitter circuit connected in series with said transmit channel and a base coupled to said first switching means, and said second electronic device is a second transistor having a collector-emitter circuit connected in shunt with said transmit channel and a base coupled to said first switching means, said first and second transistors being rapidly switched by said first switching means between nonconductive states and states of saturated conduction, whereby the attenuation provided by said first and second transistors to signals in said transmit channel abruptly changes between a very low negligible level and a much higher level as said first attenuation pad is inserted into and removed from said transmit channel.

5. The echo suppressor of claim 2 further including a peak detector means coupled to said receive channel for providing a floating reference signal with a level that is linearly related to an average peak level of the receive channel signal, a comparator means coupled to said peak detector and said transmit channel for linearly comparing the transmit channel peak signal level with the level of said floating reference signal, an inhibiting means coupled to said first switching means, and a second switching means coupled between said comparator means and said inhibiting means for activating and deactivating said inhibiting means in response to said transmit channel peak signal level rising above and dropping below, respectively, the level of said floating reference signal, said inhibiting means being effective when activated to cause said first switching means to remove said first attenuation pad from said transmit channel and to prevent said first switching means for reinserting said first attenuation pad into said transmit channel.

6. The echo suppressor of claim 5 further including a second relatively low loss attenuation pad for said receive channel, said second switching means being coupled to said second attenuation pad for inserting and removing said second attenuation pad into and out of said receive channel as said transmit channel peak signal level rises above and drops below, respectively, the level of said floating reference signal.

7. The echo suppressor of claim 6 further including a second delay means coupled between said comparator means and said second switching means for delaying the deactivation of said inhibiting means and the removal of said second attenuation pad from said receive channel for a predetermined period after the transmit channel peak signal level drops below the level of said floating reference signal.

8. The echo suppressor of claim 7 wherein said second attenuation pad comprises at least one unidirectional conducting device coupled in shunt with said receive channel, and said second switching means inserts and removes said second attenuation pad into and out of said receive channel by forward biasing and reverse biasing, respectively, said unidirectional conducting device.

9. The echo suppressor of claim 7 wherein said second switching means gradually inserts and removes the loss provided by said second attenuation pad into and out of said receive channel whereby changes in the receive channel signal level caused by the insertion and removal of said second attenuation pad are gradual.

10. The echo suppressor of claim 9 wherein said receive channel is a balanced channel, said second attenuation pad comprises a pair of identically poled diodes each connected between a respective side of said receive channel and said second switching means, and said second switching means applies a gradually increasing and a gradually decreasing forward bias to said diodes as said second attenuation pad is inserted and removed, respectively, from said receive channel to thereby gradually vary the attenuation afforded by said diodes.

11. In an echo suppressor for telephone systems having separate transmit and receive signal channels, the combination comprising a first attenuation pad including a first transistor having a collector-emitter circuit connected in series with said transmit channel and a base, and a second transistor having a collector-emitter circuit connected in shunt across said transmit channel and a base; and a control circuit coupled between said receive channel and the bases of said first and second transistors for switching said first transistor between a nonconductive state and a state of saturated conduction and said second transistor between a state of saturated conduction and a nonconductive state as said receive channel signal rises above and drops below, respectively, a predetermined threshold level to thereby sharply increase and reduce the attenuation in said transmit channel.

12. The combination of claim 11 wherein said control circuit is also coupled to said transmit channel, and further including a pair of identically poled diodes each connected between a respective side of said receive channel and said control circuit, said control circuit forward biasing and reverse biasing said diodes as said transmit channel signal rises above and drops below, respectively, an average peak level of said receive channel signal.

13. In an echo suppressor for telephone systems having separate transmit and receive signal channels, the combination comprising a peak detector means coupled to said receive channel for providing a floating reference signal that has a level which is representative of the average peak level of the receive channel signal, a comparator means coupled to said peak detector means and to said transmit channel for comparing the transmit channel signal level with the level of said floating reference signal, a switching means coupled to said comparator to be gradually switched to one state of conduction and to another state of conduction as said transmit channel signal level rises above and drops below, respectively, the level of said floating reference signal, and an attenuation pad connected in said receive channel and coupled to said switching means, said attenuation pad providing a gradually increasing amount of attenuation as said switching means is switched to said one state of conduction and a gradually decreasing amount of attenuation as said switching means is switched to said other state of conduction.

14. The combination of claim 13 wherein said attenuation pad comprises a pair of identically poled, normally back biased, semiconductor diodes each connected between a respective side of said receive channel and said switching means, and wherein said switching means applies a gradually increasing and a gradually decreasing forward bias to said diodes as said switching means is gradually switched to said one state of conduction and to said other state of conduction, respectively.

15. The combination of claim 13 further including inhibiting means coupled to said switching means, and means to manually activate said inhibiting means for switching said switching means to said other state of conduction and for maintaining said switching means in said other state of conduction regardless of the relative levels of said transmit channel signal and said floating reference signal.

16. For long distance telephone systems of the type that include a 4-wire circuit which provides separate transmit and receive channels for both a near end subscriber and a far end subscriber, a differential split echo suppressor for inserting and removing loss into and out of the transmit and receive channels for the near end subscriber to prevent the return of potentially disturbing echo signals toward the far end subscriber while permitting the near end subscriber to break-in at will, said echo suppressor comprising the combination of a first attenuation pad for providing a relatively large amount of suppression loss, a second attenuation pad for providing a relatively small amount of break-in loss, a full wave rectifying means for providing a DC signal that has a level which is linearly related to and which closely follows changes in the near end receive channel level, a threshold detecting means coupled to said full wave rectifying means for comparing the level of said DC signal with a predetermined threshold level, a first switching means coupled between said threshold detecting means and said first attenuation pad for inserting and removing said first attenuation pad into and out of said near end transmit channel as the level of said DC signal rises above and drops below, respectively, said threshold level, a first delay means coupled to said switching means for delaying the removal of said first attenuation pad from said near end transmit channel in response to a drop of said DC signal to a level below said threshold level until the level of said DC signal has remained below said threshold level for a predetermined suppression hangover time, an inhibiting means coupled to said first switching means, said inhibiting means being effective when activated to cause said first switching means to remove said first attenuation pad from said near end transmit channel and to maintain said first attenuation pad removed from said near end transmit channel until said inhibiting means is deactivated, a peak detector means coupled to said full wave rectifying means for providing a floating reference signal that has a level that is linearly related to the average peak level of said near end receive channel signal, a comparator means for comparing the near end transmit channel signal level with the level of said floating reference signal, a second switching means coupled between said comparator and both said inhibiting means and said second attenuation pad for activating and deactivating said inhibiting means and inserting and removing said second attenuation pad into and out of said receive channel as said near end transmit channel signal level rises above and drops below, respectively, the level of said floating reference signal, and a second delay means coupled to said second switching means for delaying the deactivation of said inhibiting means and the removal of said second attenuation pad from said near end receive channel until said near end transmit channel signal level has remained below the level of said floating reference signal for a predetermined break-in hangover time.

17. The differential split echo suppressor of claim 16 wherein said full wave rectifying means comprises an operational amplifier having an inverting input coupled to said receive channel and an output, a pair of oppositely poled diodes connected in parallel through respective feedback resistors between the output and the inverting input of said operational amplifier, and a summing circuit having one input coupled to said receive channel and another input coupled to a junction between one of said diodes and its respective feedback resistor.

18. The differential split echo suppressor of claim 16 wherein said first attenuation pad comprises a first transistor having a collector-emitter circuit connected in series with said near end transmit channel and a base coupled to said first switching means, and a second transistor having a collector-emitter circuit connected in shunt across said near end transmit channel and a base coupled to said first switching means, and wherein said first switching means inserts said first attenuation pad into said transmit channel by switching said first transistor to a nonconductive state and said second transistor to a state of saturated conduction and removes said first attenuation pad from said near end transmit channel by switching said first transistor to a state of saturated conduction and said second transistor to a nonconductive state, whereby said first attenuation pad is inserted and removed from said near end transmit channel without the production of switching transients.

19. The differential split echo suppressor of claim 16 wherein said second attenuation pad comprises a pair of identically poled, normally back biased, semiconductor diodes each connected between a respective side of said near end receive channel and said second switching means, and said second switching means applies a gradually increasing and a gradually decreasing forward bias to said diodes for respectively inserting and removing said second attenuation pad into and from said near end receive channel, whereby said second attenuation pad is inserted and removed from said near end receive channel without the production of switching transients and while causing only gradual changes in the near end receive channel signal level.

20. The differential split echo suppressor of claim 19 wherein said first attenuation pad comprises a first transistor having a collector-emitter circuit connected in series with said near end transmit channel and a base coupled to said first switching means, and a second transistor having a collector-emitter circuit connected in shunt across said near end transmit channel and a base coupled to said first switching means, and wherein said first switching means inserts said first attenuation pad into said transmit channel by switching said first transistor to a nonconductive state and said second transistor to a state of saturated conduction and removes said first attenuation pad from said near end transmit channel by switching said first transistor to a state of saturated conduction and said second transistor to a nonconductive state, whereby said first attenuation pad is inserted and removed from said near end transmit channel without the production of switching transients.

21. The differential split echo suppressor of claim 20 wherein said full wave rectifying means comprises an operational amplifier having an inverting input coupled to said receive channel and an output, a pair of oppositely poled diodes connected in parallel through respective feedback resistors between the output and the inverting input of said operational amplifier, and a summing circuit having one input coupled to said receive channel and another input coupled to a junction between one of said diodes and its respective feedback resistor.

22. A method for suppressing echo signals in telephone systems of the type that include a 4-wire circuit interconnecting near end and far end subscribers and separate transmit and receive signal channels for each of said subscribers within said 4-wire circuit, said method comprising the steps of deriving from said near end receive channel a DC signal that has a level which is linearly related to and which closely follows the level of said near end receive channel signal, comparing the level of said DC signal with a predetermined threshold level, inserting and removing a first attenuation pad into and from said near end transmit channel as said DC signal level rises above and drops below, respectively, said threshold level, and delaying the removal of said first attenuation pad from said near end transmit channel until said DC signal level has remained below said threshold level for a predetermined time.

23. The method of claim 22 further including the steps of deriving from said DC signal a floating reference signal that has a level which is linearly related to the near end receive channel average peak signal level, comparing the near end transmit channel signal level with the level of said floating reference signal, inserting and removing a second attenuation pad into and from said near end receive channel as said near end transmit channel signal level rises above and drops below, respectively, the level of said floating reference signal, inhibiting and enabling the insertion of said first attenuation pad into said near end transmit channel as said transmit channel signal level rises above and drops below, respectively, the level of said floating reference signal, and delaying the removal of said second attenuation pad from said near end receive channel and preventing the insertion of said first attenuation pad into said near end transmit channel until the transmit channel signal level has remained below the level of said floating reference signal for a predetermined time.